Jan. 1, 1963 S. KRINOV 3,070,990
SAMPLING DEVICE AND METHOD FOR ANALYSIS OF FURNACE GASES
Filed Feb. 11, 1960
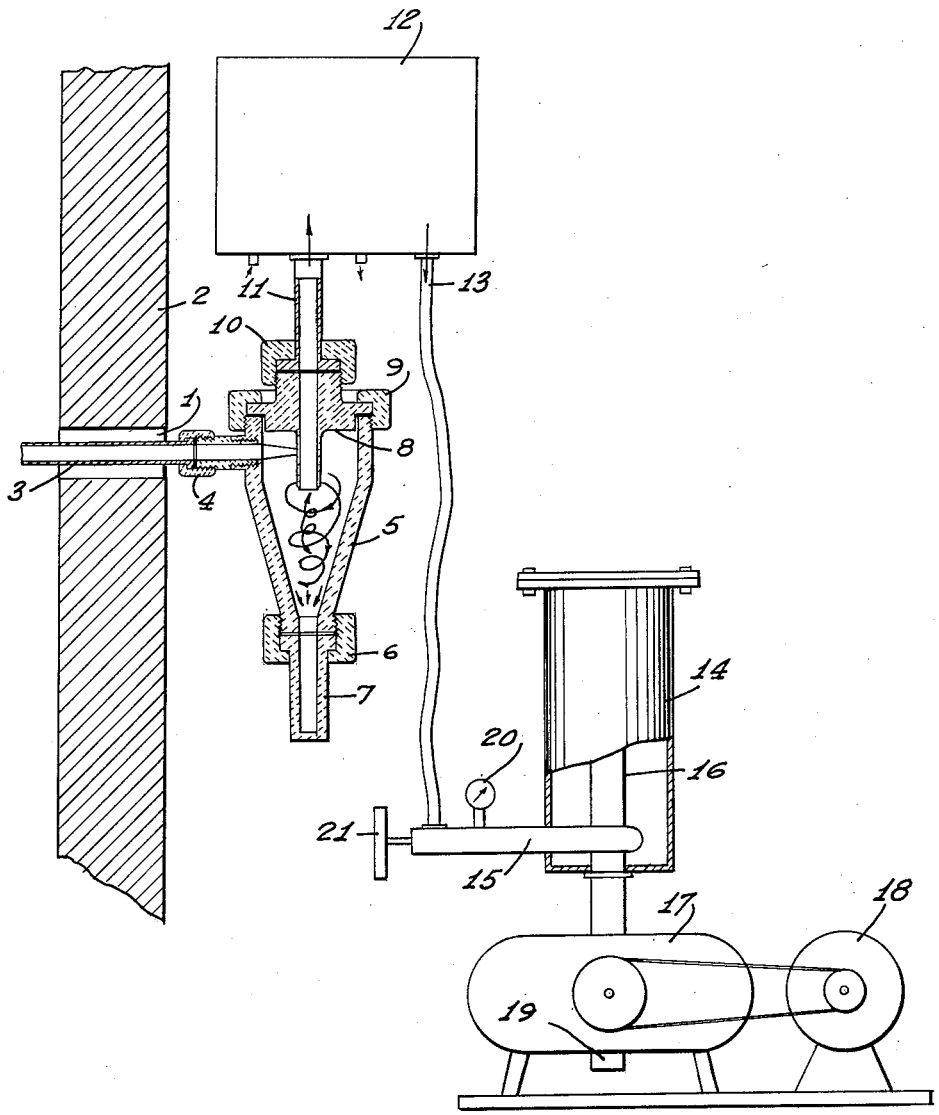
INVENTOR
STANLEY KRINOV
BY Beale and Jones
ATTORNEYS

United States Patent Office 3,070,990
Patented Jan. 1, 1963

3,070,990
SAMPLING DEVICE AND METHOD FOR ANALYSIS OF FURNACE GASES
Stanley Krinov, Wadsworth, Ohio, assignor, by mesne assignments, to Pittsburgh Plate Glass Company
Filed Feb. 11, 1960, Ser. No. 8,022
3 Claims. (Cl. 73—25)

This invention pertains to sampling furnace gases for purposes of separating dust particles from condensate rich gases, subsequent condensation and analysis of dust and condensate, and to apparatus for accomplishing such separations.

In the past it has been impossible to obtain a representative dust sampling of high temperature furnace gases with a cyclone or other type of dust separator. Usually the temperature of the gas to be analyzed was limited by the upper temperature limit at which the cyclone separator could operate, although some attempts were made to operate beyond this limit by either cooling the gases before entering the cyclone or cooling them therein by cooling the cyclone. Both of these methods have proved to be unsatisfactory, since the cooled gases have a tendency to deposit condensate on the walls of either the precooling device or in the cyclone which collects the dust in the gases, causing either the precooling device or the cyclone to become clogged. This entails frequent cleaning of the apparatus and also contributes to inaccurate results in determining the dust content of the furnace gas, apart from analysis of the condensable portions of the gas.

Ceramic cyclones are also known from the prior art, however because of susceptibility to warping and inability to machine the ceramics to close tolerances the cyclones made from such materials have not been entirely satisfactory. Difficulties in molding moist clay-like materials are also encountered.

One object of this invention is to overcome the temperature limitations of cyclone separators for dust separation in furnace gas analysis.

Another object of the invention is to separate, for purposes of analysis, dust particles from evaporated solids and condensable materials contained in furnace gas.

Another object is to develop a portable sampling train than can be moved to test samples from various parts of a furnace for analysis of furnace gas.

Another object of the invention is to manufacture a dust collector having excellent resistance to abrasion, heat, chemicals and thermal shock, thereby permitting operation at the same temperature as that of the furnace gas, thereby avoiding premature cooling and collection of condensate.

Another object of the invention is to provide an apparatus that will representatively sample and selectively separate the condensates and dust components of furnace gas for the purpose of analysis.

The drawing is a diagrammatic representation of a preferred embodiment of the novel system utilizing an embodiment of the novel separator for hot gases and solids.

In the drawing, a conventional port 1 is shown in the wall 2 of a glass or other furnace for melting or fusing materials having a high softening point. The port is above the level of the material being processed, and conventional means is provided for maintaining this level in the furnace. In use, a ceramic refractory sampling tube 3 is inserted through the port for sampling the gas. The flanged tube 3 is held in sealing engagement with a threaded nipple providing an opening in the upper side wall of an inverted frustro-conical cyclone separator 5, the opening being arranged to direct a mixture of hot gas and suspended solids tangentially of the separator side wall and against the inner surface thereof. A threaded coupling 4 holds the flanged end of the sampling tube 3 in engagement with the fitting which is integral with the conical element. A solid or dust collecting and sampling cup is held in sealing engagement with the small or bottom end of the frustro-conical separator by means of a threaded sleeve 6, the threaded portion of which engages matching threads on the cone 5, and which holds a flange of the mouth of cup 7 in said engaging relationship. At the large, or wider top, end of the conical separator a closure and gas outlet element 8 is held in sealing engagement with the side wall by a threaded ring or sleeve 9, the threads of which mate threads on the side wall, the closure portion being in the form of a flange integral with the outlet tube, which is coaxial with the conical separator. The gas outlet tube of the top closure member extends within the cyclone to a point just below the tangential inlet connected with the sampling tube 3. The axis of said tangential inlet coincides with an imaginary line along a plane perpendicular to the axis of the conical separator and gas outlet tube, said plane intersecting the portion of the outlet tube which extends downwardly into the interior of the separator. The relationship and dimensions of the inlet, gas outlet, and conical separator are in accordance with known principles of the construction of cyclone separators. Thus, the length along the axis of the frustro-conical element 5 threaded externally at each end, is six inches, the inside diameter thereof at the upper end is two inches and at the bottom or smaller end is three-fourths inch. The gas outlet tube forming a part of closure 8 extends within the upper end of the cyclone a distance of two and five-sixteenths inches. The hot gas inlet opening adjoining sleeve 4 is three-fourths inch in diameter, and the inside diameter of the gas outlet tube is three-fourths inch. The outlet tube, for the gas free of entrained discrete solids, is extended outside of the solids separator, the upper end of which has threads. These threads engage threads of a ring 10, which holds a flange of a tube 11 in sealing engagement with the outer end of the gas outlet tube by abutting thereagainst. All of parts numbered consecutively 4 through 11 are constructed of machined "G" stone fired as described herein. Sampling tube 3 is of a ceramic material formed by pressure extruding a plastic ceramic-forming composition, drying, and firing. Such procedure is of course not amenable to use for forming complex shapes such as the cyclone.

The coupling rings or collars 4, 6, 9, and 10 are similar to one another, each having a cylindrical wall with screw threads on the inner or outer portion of the wall at one end of the cylinder, and having at the other end of the cylinder an integral annular flange extending toward the longitudinal axis of the ring. The flange of the ring overlaps and engages a flange on the element such as the tubes 3 and 4, the sampling cup 7, and the top closure and gas outlet tube 8, the threads of the rings engaging the parts against which these elements are drawn into sealing engagement.

A sealing composition is placed between parts at the abutting junctures of the flange of the gas sampling tube 3 with the end of the gas inlet, of the solids sampling cup 7 with the solids separator 5, of the flange on the closure element 8 with the top of the cyclone wall 5, and of the tube 11, leading to the heat exchanger, with the upper end of the tube portion of the closure part 8. This composition must be such that it is infusible up to about 3000° F., and compressible to form a good seal. In this regard, it is important that in assembling the junctures there is no slippage therebetween, since usable sealing materials are disrupted thereby, and the importance of the use of suitable coupling devices such as the flanged rings or collars to avoid such slippage becomes apparent. A suitable sealing material is sold under the name "Fiberfrax" by the Carborundum Co., Perth Amboy, N.J. This material is sold as bulk fibers, as formed sheets resembling blotting paper, and as a string. The string is useful for packed nut sealing arrangements such as at the gas inlet of the heat exchanger, and the sheets are useful for forming gaskets between said junctures. This material is fibrous, the fibers being from about one millimeter to about 7.5 cm. in length, and between about one and about 10 microns in diameter. The chemical composition is approximately 50% $SiO_2$ and 50% $Al_2O_3$.

The refractory tube or conduit 11, which is held in engagement with the outlet tube of the cyclone by means of the coupling ring 10, is inserted into a heat exchanger 12 and held in sealing engagement therewith by any convenient means, preferably avoiding direct contact between the tube 11 and metal parts of the heat exchanger. One suitable connection is by a packed, threaded ring (not shown) similar to the earlier described rings, but with packing such as "Fiberfrax" string serving to form a seal between the outside of the tube and the heat exchanger shell. A preferred type of heat exchanger and condenser is one in which the cooling fluid, such as water, passes around a tubular metal coil such as stainless steel tubing. The tube 11 leading from the cyclone to the heat exchanger extends within the heat exchanger and is connected with the tubular metal coil.

A flexible conduit 13, for example, constructed of rubber hose, leads from the heat exchanger to a condensate trap 14, by way of conduit 15, preferably rigid, to which the flexible tube is connected. Within the condensate trap, pipe 15 opens near the bottom of a closed container for trapping condensed liquid. A centrally located gas conducting tube 16 opens below the top of the container, and leads past the tube 15 and out of the condensate trap.

The gas outlet conduit leads to a positive displacement pump 17 driven by a motor 18. A gas outlet 19 from the pump leads to the atmosphere, or alternatively to means (not shown) for analyzing components of the gas which are not separated as discrete solids of dust in the cyclone, and which are not condensable at atmospheric pressure at the temperature of the cooling water, suitably about 50° F. and up to about 120° F.

In operation, the open end of the sampling tube 3 is placed so that the axis of the sampling end of the tube is generally parallel to the flow of hot gases carrying entrained solids and condensable matter to be sampled. For example port 1 as illustrated may be a sight port of a regenerative glass furnace. The design and positioning of the sampling tube depends upon the direction of flow of the gas to be sampled; the position is such that the gases flow toward the sample-receiving end of the tube and generally parallel to the axis thereof. The gas entering the cyclone may be up to about 3000° F., and is cooled by only about 100° F. in passing through the cyclone. The mixture of entrained dust, and condensable and non-condensable vapor or gas is separated by the cyclone, the dust being collected in cup 7. The flow of water around the heat exchanger tubes is such that the exit gas and condensate entering tube 13 is cooled to between about 90° F. and 120° F., preferably 100° to 110° F. The cooling water is normally at about 50° F., but may be warmer or cooler if desired. Since the metal cooling coils are surrounded with cooling fluid, the hot gases entering the coils are immediately cooled and deterioration of the metal is avoided. The cool gas and liquid pass through flexible connector 13, which is in reality much longer than illustrated to permit placing the sampling tube within higher ports. The liquid condensate, which comprises solids that are vaporized or sublimed at the temperature of operation of the cyclone as well as materials such as water which condense to a liquid form, is collected in the trap 16. Gases not condensed at about 90°–120° F. are withdrawn through the gas outlet tube 16 by means of the pump 17, from whence they may be expelled to the atmosphere or conducted to analytical apparatus.

It has been found that a particular type of mineral composition referred to in the art as "G" stone or "Wonderstone" can be machined in the unfired state to the accurate tolerances necessary for manufacturing a relatively small cyclone dust separator. The advantages of using Wonderstone for a refractory are numerous in that it is easily machined, can be worked to fine tolerances, has excellent resistance to heat shock and corrosive elements, and outstanding strength characteristics. Two unimportant limitations of the material are its shrinkage (about 3 or 4%) on firing and a tendency to crack at high temperatures if the stone is over one inch thick.

"G" stone is a sedimentary rock of clay-like composition apparently formed by the alteration and devitrification of glass-like volcanic tuff. It is a very fine grained compact rock of uniform texture and composition. It is sometimes referred to as "K" stone or "Koranna." The main quarries are located at the farms of Gestoptefontein No. 145 and Driekul No. 184 N. and N.E. of Ottosdal in the Lichtenberg district, Western Transvaal, Union of South Africa.

Identification of the mineral crystals of "G" stone has revealed that it consists of pyrophyllite, rutile, chloritoid or epidote, hematite (occasionally found near the surface) and pyrite. The crystal identification has been born out by the folowing chemical analysis, B&C being different samplings from bore holes adjacent to the quarry at Gestoptefontein.

|  | Percent A (main quarry) | Percent B (125 ft. depth) | Percent C (207 ft. depth) |
| --- | --- | --- | --- |
| $SiO_2$ | 56.18 | 57.19 | 54.56 |
| $Al_2O_3$ | 32.76 | 32.78 | 32.83 |
| $Fe_2O_3$ | 0.64 | 0.72 | 2.38 |
| $TiO_2$ | 2.45 | 2.08 | 2.58 |
| $CaO$ | 0.72 | 0.40 | 0.32 |
| $MgO$ | 0.78 | 0.36 | 0.50 |
| Ignition loss | 6.60 | 6.54 | 6.82 |
| Sulphur | 0.17 |  | 0.06 |

Carbon varies between 0.46% and 1.04% by weight depending on the depth of the mine, the percentage increasing with the depth.

M. Kirchberger & Co. Inc., 83–91 Forrest Avenue, Englewood, N.J., sells a mineral known as type "A" Lava similar in firing and mechanical properties to "G" Stone. This mineral has also been used for making the cyclone dust collector. The chemical analysis of type "A" Lava is as follows:

| | |
| --- | --- |
| $SiO_2$ | 55.5 |
| $MgO$ | 0.31 |
| $Al_2O_3$ | 35.24 |
| $TiO_2$ | 2.80 |
| Loss on ignition | 6.15 |

It is apparent that the two major mineral components rutile and pyrophyllite do not vary greatly throughout the mine and the "G" stone is fairly uniform in composition as a mineral. In working with the mineral, the two disadvantages previously mentioned, viz., cracking where fired in thick sections and shrinkage, can be overcome by proper handling and utilization of the mineral. The size and wall thickness of the cyclone will be limited to some extent by the tendency toward cracking at elevated temperatures; however this limitation is offset somewhat by working with shapes having rounded corners or rounded shapes per se.

The dehydration curves for Wonderstone indicate an approximate 3 to 4% water loss which probably accounts for the shrinkage which is in the order of 1 to 4% also. In machining the mineral very close tolerances can be maintained both before and after firing because of the outstanding characteristcs of uniform shrinkage. The heating procedure, however, is critical and when firing from the green state (no prior heating), heating from ambient temperature to 1800° or 1900° F. at the rate of 0.75 to 1.6° F./minute is preferred. Faster heating rates sometimes result in cracking the piece.

In order to determine what elements, compounds, and minerals are present in the furnace gases and flue gases of a typical glass making furnace which uses sand, soda ash and a calcium containing compound as the major components in the approximate ratio of 600 lbs. sand, 300 lbs. soda ash, and 225 lbs. of the calcium compound, the batch also containing small amounts of iron and sulfur, the iron being used to impart certain desirable properties to the glass product such as an amber color. The calcium-containing compound (one of the 3 major ingredients mentioned above) in this example is a by-product of iron manufacturing consisting essentially of calcium ferro silicate but containing quantities of many other elements that occur in iron ore. This compound provides the calcium for soda-lime-silica glass which is commonly used to manufacture amber glass. The furnace is a typical glass melting furnace of the regenerative type, gas fired.

The sampling was accomplished by positioning the sampling equipment next to the regenerator so that the sample tube extended into the regenerator through a sight port located opposite to one of the furnace ports and just above the top course of regenerator bricks. The gas temperature at the cyclone inlet was between 2600° F. and 2800° F.

A flow of cooling water was started through the heat exchanger and the vacuum pump was turned on. In order to avoid the possibility of spalling of the ceramic and refractory parts of the equipment due to extreme thermal shock, the vacuum pump was turned off after about 5 seconds and then turned on again 5 to 10 seconds later. This warm-up period is not necessary on subsequent runs if the ceramic and refractory parts are still hot from a previous sampling run. The start-up of the sampling run was timed to coincide with a furnace reversal so that the sampling would be obtained from a definite number of complete firing cycles rather than fractions of a cycle. During a regenerating period no products are found to collect in the sampling device since the gas passing the sampling tube is merely preheated air. The outlet temperature of the cyclone was approximately 100° F. below the inlet temperature thereof. At the end of 110 minutes which represents 60 minutes of firing and 50 minutes of regeneration, the pump was turned off and the dry solids were removed from the sample cup of the cyclone collector and the condensation products were drained from the condensate trap. The dry carryover sample was placed in a vial and labelled and the liquid sample was placed in a bottle and labelled. These samples were analyzed as follows:

| | |
|---|---|
| Period of sampling (firing cycle) min | 60 |
| Volume of condensate sample mls | 1940 |
| Concentration of dissolved solids gms./liter | 5.76 |
| Total weight of dissolved solids (calculated) gms | 11.15 |
| Concentration of sulfur compounds (as $SO_4$) gms./liter | 1.85 |
| Total weight of sulfur compounds (as $SO_4$) (calculated) gms | 3.59 |
| Degree of acidity by pH measurement pH | 2.6 |
| Degree of acidity by titration (as $H_2SO_4$ conc.) gms./liter | 0.20 |
| Total weight of dry solids from cyclone collector gms | 0.1636 |
| Percent of dry solids which is water soluble percent | 54.78 |
| Weight of insoluble portion of dry solids (calc.) gms | 0.072 |
| Concentration of sulfur compounds in dry solids (as $SO_4$) percent | 33.92 |
| Total weight of sulfur compounds in dry solids (as $SO_4$) gms | .055 |

The dry solids sample was then submitted to a mineralogical laboratory for a petrographic study to provide additional information as to the matter of the dry solids sample. This yields additional insight as to the physical and chemical forces acting within the furnace.

In a previous but similar sampling run the condensate sample was further analyzed for determination of other elements as follows:

| | Iron | Silicon | Aluminum | Sodium | Calcium | Magnesium |
|---|---|---|---|---|---|---|
| Concentration, gms./liter | 1.25 | 0.026 | 0.16 | 0.17 | 0.005 | 0.002 |
| Weight, gms | 0.80 | 0.17 | 0.103 | 0.11 | | |

The data may be used to estimate the total masses of solids and condensable vapors leaving a furnace with the flue gases. The pump is a positive displacement type which delivers a known weight of gas if the temperature, pressure and pump speed are known. The performance curves for the pump are supplied by the manufacturer. The curves show the relationship of pump speed and volume of air delivered at various temperatures and pressures.

The reproducibility of the sampling device was established by conducting a series of 14 sampling runs as rapidly as possible and with close attention to uniform procedures. This reproducibility study was conducted on a furnace used in the manufacture of soluble glass (sodium silicate) located at the Columbia Southern Chemical Corporation plant at Barberton, Ohio. All runs represent 60 minutes of firing time and 40 minutes of regeneration time totalling 100 minutes for each sampling run. The quantity of condensate and concentration of dissolved solids only were measured. These measurements are listed below:

| Volume of Condensate: | Total gms. of solids |
|---|---|
| 2040 | 1.91 |
| 2040 | 2.16 |
| 2030 | 2.12 |
| 1830 | 2.18 |
| 1850 | 1.81 |
| 1920 | 2.01 |
| 1960 | 2.03 |
| 1950 | 1.92 |
| 1960 | 2.01 |
| 1980 | 2.14 |
| 1800 | 1.69 |
| 1830 | 1.94 |
| 1820 | 2.24 |
| 1860 | 2.06 |

A statistical analysis of these results will show that the standard deviation is about 5% at 95% reliability.

The design of and operating conditions and methods for the sodium silicate furnace used in these tests is very similar to that of most soda-lime-silica glass melting furnaces; the major difference in sodium silicate manufacturing is that the batch contains only sand and soda ash, the proportions of which are again approximately the same as that used in a typical glass batch.

The solids found in the condensate are dissolved solids determined by laboratory evaporation of the condensate sample and weighing the dry residue. These solids appear in the condensate due to condensation of sublimed or vaporized materials occurring within the melting zones of the furnace. These vaporized materials leave the furnace with the flue gases containing also a relatively large amount of water vapor, which water vapor, when condensed, makes up the major bulk of the condensate sample and serves also rinse the condensed solids into the condensate trap. Dry particulate solids were also collected in the cyclone during these runs but no measurements were made of the quantities of these dust samples since it was deemed sufficient to measure only the condensate samples to establish reproducibility of the apparatus. It may be inferred that the reproducibility of the apparatus is better than the 5% variation shown since variations also are expected to occur in the actual composition of the furnace flue gas from run to run and additionally variations are expected in the laboratory determinations.

I claim:

1. In a process of sampling an atmosphere of 1000°–3000° F. furnace gases and particulate matter suspended therein the improvement of:
   (a) introducing a sample of said atmosphere into a cyclone collector made of "G" stone, said cyclone having a detachable closed sampling cup attached to the bottom thereof;
   (b) maintaining said cyclone at the same temperature as said atmosphere thereby avoiding premature condensation resulting in inaccurate analysis;
   (c) separating and collecting a sample of said particulate matter in said cup of said cyclone;
   (d) withdrawing the gas from said cyclone and introducing said gas into a fluid cooled condenser;
   (e) condensing the condensible portions of said gases in said condenser by cooling to about 100° F.;
   (f) introducing the condensed portions of said gases into a trap and maintaining said portions in liquid form;
   (g) and measuring the quantities of said condensed portions of said gases and said separated particulate matter collected per unit of time.

2. In a process of sampling an atmosphere of 1000–3000° F. furnace gases and particulate matter suspended therein the improvement of:
   (a) inserting one end of a refractory sampling tube into a stream of said atmosphere, the other end of the tube being directly attached to a cyclone made of "G" stone and said cyclone having a detachable closed dust-sampling cup attached to the bottom thereof;
   (b) maintaining a linear rate of flow of said atmosphere in said sampling tube at substantially the same linear rate of flow of the atmosphere being sampled;
   (c) maintaining said cyclone at substantially the same temperature as said atmosphere thereby avoiding premature condensation resulting in inaccurate analysis;
   (d) separating and collecting a sample of said particulate matter in said cup of said cyclone;
   (e) withdrawing the gas from said cyclone and introducing said gas into a fluid cooled condenser;
   (f) condensing the condensible portions of said gases in said condenser by cooling to about 100° F.;
   (g) introducing the condensed portions of said gases into a trap and maintaining said portions in liquid form;
   (h) and measuring the quantities of said condensed portions of said gases and said separated particulate matter collected per unit of time.

3. A device for sampling 1000°–3000° F. furnace gases comprising a fired mineral cyclone type dust collector having excellent strength and resistance to thermal shock, chemicals and abrasion, said collector being manufactured from a mineral of volcanic origin selected from the group consisting of "G" stone and type A lava, said collector having a detachable closed sampling cup attached to the bottom of said collector; said collector being directly connected at its gas inlet with a sampling tube for sampling hot gases; and connected at its gas outlet in series with a fluid cooled condenser; a condensate trap; and a motor driven blower, whereby hot gases may be separated into fractions of discrete dust particles; condensed materials; and noncondensible gases.

References Cited in the file of this patent

UNITED STATES PATENTS

| 1,071,180 | Remington | Aug. 26, 1913 |
| 2,530,077 | Ramsing | Nov. 14, 1950 |
| 2,797,076 | Muller | June 25, 1957 |
| 2,915,365 | Saussol | Dec. 1, 1959 |

FOREIGN PATENTS

| 581,426 | Great Britain | Oct. 11, 1946 |